United States Patent Office 3,778,457
Patented Dec. 11, 1973

3,778,457
CLAY-ARENE COMPLEXES AND PROCESS OF PRODUCING SAME
Max M. Mortland, East Lansing, Mich., and Harvey E. Doner, Lafayette, Calif., assignors to the Board of Trustees of Michigan State University, East Lansing, Mich.
Continuation-in-part of abandoned application Ser. No. 78,126, Oct. 10, 1970. This application May 1, 1972, Ser. No. 249,686
Int. Cl. C07f 1/08, 1/10
U.S. Cl. 260—430                     12 Claims

ABSTRACT OF THE DISCLOSURE

A clay-arene complex characterized by $\pi$-bonding of the arene molecule to the clay through a metal ion base exchanged onto the surface of the clay. Such a complex is characterized by an intense color dependent on the particular arene in the complex and the ion on the clay and by an infrared absorption spectrum totally different from that of the liquid or solid arene and of the physically adsorbed arene.

This application is a continuation-in-part of our copending application, Ser. No. 78,126, filed Oct. 10, 1970, and now abandoned.

BACKGROUND OF THE INVENTION

Field

This invention relates to organo-clay complexes, in particular to complexes of certain ion exchanged clays with arene compounds, as for example, benzene and cupric-exchanged hectorite.

Prior Art

Since the early 1930's many investigations into the nature and types of organic complexes with clay minerals have been undertaken and extensive literature has been published describing the results of these investigations. A review of organic-clay reactions is given by Grim in his book "Clay Mineralogy," 2nd edition, McGraw-Hill, Inc., 1968, pp. 353–426. The mechanisms causing the bonding of organic molecules to clays are generally of five types, viz: (1) base exchange between organic cations and the exchangeable cations of the clay creating an ionic bond; (2) adsorption of nonionic, generally polar organic compounds on the surface of the clay due to Van der Waals forces and/or the formation of a C—H . . . O (clay-mineral surface) bonds; (3) reaction of polyvalent exchangeable cations on the clay surface with anionic organic compounds, creating an ionic bond between the anionic organic compound and the exchangeable cation; (4) base exchange between a cationic organometallic compound, creating an ionic bond through the metallic ion in the organometallic compound; and (5) reaction of exchangeable cations on the clay surface with organic compounds capable of forming complexes with the exchangeable cation. Combinations of these mechanisms may take place simultaneously, such as in the base exchange of n-alkyl ammonium compounds wherein an ionic bond is formed between the cationic nitrogen atom and the anionic clay surface followed by adsorption of the n-alkyl hydrocarbon chains on the clay surface.

Numerous investigators have included in their investigations the effect of bringing together various arene compounds and clays. Bradley (JACS, vol. 67, 1945, pp. 975–981) found that benzene forms a two-layer complex with sodium and calcium exchanged montmorillonite, the bonding apparently between the clay surface and the aromatic ring involving polarization of the ring, thus decreasing the normal Van der Waals thickness of the aromatic ring. MacEwan (Trans. Faraday Soc., vol. 44, 1948, pp. 349–367) also found a two-layer complex with ammonium exchanged montmorillonite and found that various naphthalenes also adsorbed on the basal plane surfaces of montmorillonite. He likened the structure of the adsorbed layers to that of adsorbed films on the surface of a crystal, being liquid in nature since one complex can be changed to another by washing with excess of another miscible liquid. Barrer et al. (Trans. Faraday Soc., vol. 50, 1954, pp. 980–989) investigated the adsorption of various compounds on sodium-rich montmorillonite and found that benzene was adsorbed only on the exterior surfaces of the clay crystals.

It is well known in the art that the exchangeable cations on the surface of clays can be exchanged with other cations, see for example Grim ("Clay Mineralogy," 2nd edition, McGraw-Hill, Inc., 1968, pp. 185–233).

SUMMARY OF THE INVENTION

We have discovered that when the exchangeable cation on the surface of clays having certain characteristics described in detail hereinafter is exchanged for a cupric or argentous ion, then the resulting cation-exchanged clay under the proper conditions forms a novel complex with arene compounds. With the foregoing in mind, it is an object of the herein described invention to provide new and useful organo-clay complexes. A further object is to provide new and useful organo-clay complexes consisting of an arene compound complexed with cupric- and argentous-exchanged clays.

Another object is to provide new and useful organo-clay complexes consisting of an arene compound $\pi$-bonded with a clay through a cupric or argentous ion on the clay surface.

A more specific object is to provide new and useful organo-clay complexes consisting of an arene compound bonded with a clay through a cupric or argentous ion on the clay surface and the $\pi$-electrons in the arene compound.

A still more specific object is to provide new and useful organo-clay complexes consisting of an arene compound complexed with a clay through a cupric or argentous ion on the clay surface and the $\pi$-electrons in the arene compound, said clay being of the swelling, three-layer type having sufficient isomorphous substitutions or lattice vacancies within the crystal lattice to create a base exchange capacity of at least twenty-five milliequivalents per 100 grams of clay on the surface of the clay.

Other objects and advantages of this invention will further become apparent hereinafter and in the drawings, in which.

DESCRIPTION OF THE PREFERRED EMBODIMENT

Figure 1:
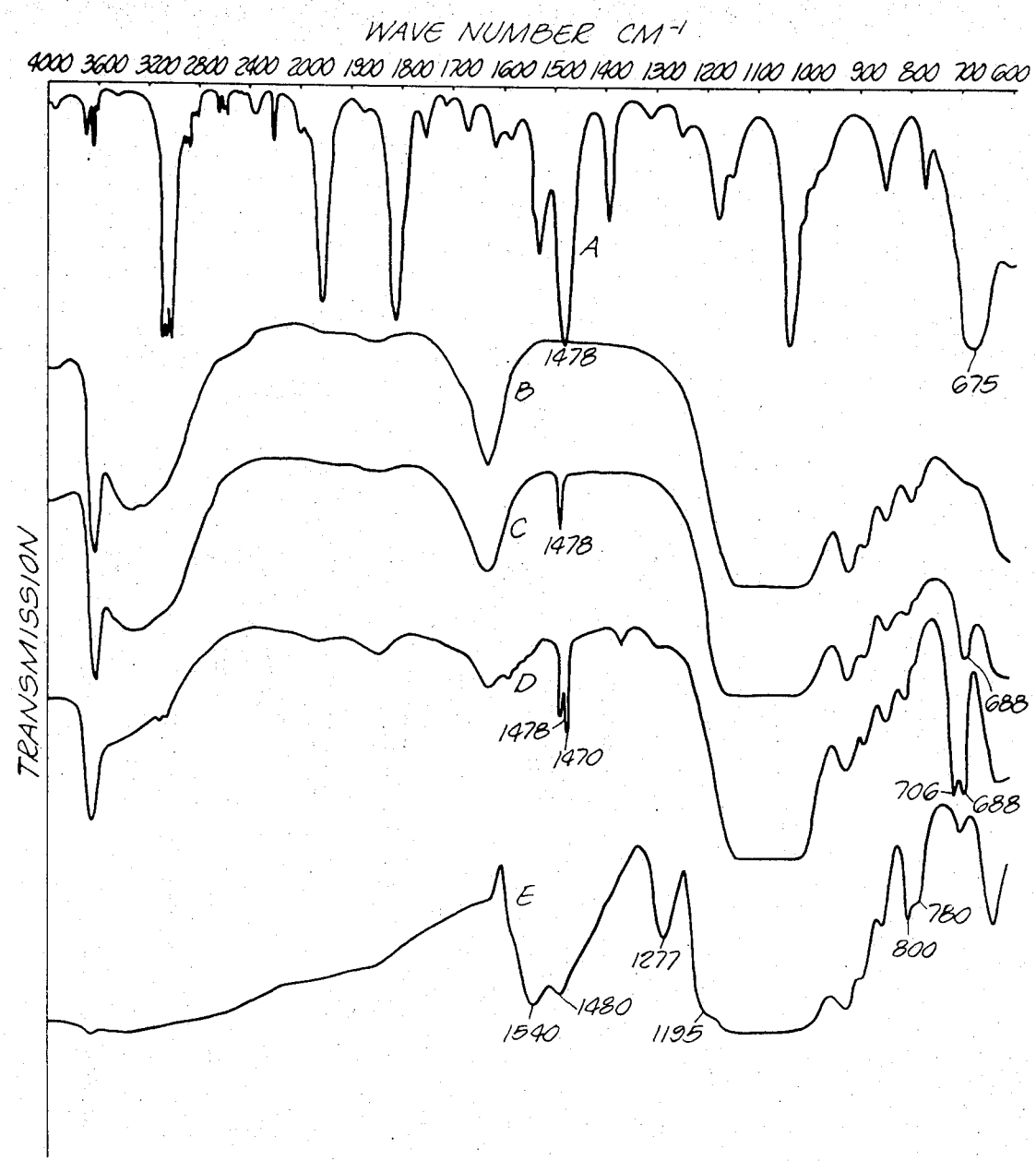
FIG. 1 shows the infrared absorption spectra of liquid benzene, of copper exchanged montmorillonite and of various complexes thereof illustrating the invention.

Generally stated and in accordance with the illustrative embodiments of this invention, the novel organo-clay complexes which we have invented are complexes between an arene compound and a clay of a particular type whose exchangeable cations have been replaced with a cation selected from the group consisting of cupric and argentous (silver I or $Ag^+$).

The clays which are useful in the complexes of this invention are the smectites, which are swelling, three-layer type sheet structures composed of two layers of silica tetrahedrons and one central dioctahedral or trioctahedral layer and having ion-exchange capacity and substitutions within the crystal lattice. Representative of such clays are montmorillonite, hectorite, and nontronite. The substitutions within the crystal lattice, which may be isomorphous replacements or simply vacancies, should occur to such an extent as to give the clay a base exchange capacity of at least 25 millequivalents per 100 grams of clay. The classification and structure of the clay minerals are given by Grim ("Clay Mineralogy," 2nd Edition, McGraw-Hill, Inc., 1968) and are well known in the art. For instance, it is known that montmorillonite is generally an aluminous dioctahedral three-layer clay having substitutions of divalent ions, principally magnesium, for a portion of the aluminum ions in the octahedral layer. Hectorite is known to be a magnesium trioctahedral three-layer clay having substitutions of lithium ions for a portion of the magnesium ions in the octahedral layer. Nontronite is an iron-rich dioctahedral three-layer clay having substitutions of trivalent aluminum ions for a portion of the quadrivalent silicon ions in the tetrahedral layers.

The substitutions which occur within the crystal lattice create a charge deficiency in the clay lattice which has to be satisfied. This charge balance is satisfied by cations on the surface of the clay, usually sodium and calcium ions. These cations can be exchanged with other cations such as those of aluminum, chromium, copper, iron, manganese, nickel, cobalt, zinc, silver, or other metals.

The exchangeable cation on the surface of the clays disclosed above, in order for the clay to be operable in this invention, must be selected from the group consisting of cupric and argentous. These ions may be exchanged onto the surface of the clays in any known manner, such as passing a clay dispersion through an ion-exchange column containing a cation-exchange resin whose cations have been replaced by cupric or argentous ions or by mixing a water soluble salt of the required cation, such as the acetate or nitrate salts of Cu(II) or Ag(I) with a clay dispersion followed by dialysis in order to remove the excess salts.

Thus the preferred clays for the practice of this invention are cupric-exchanged montmorillonite, argentous-exchanged montmorillonite, cupric-exchanged hectorite, argentous-exchanged hectorite, cupric-exchanged nontronite, and argentous-exchanged nontronite.

More specifically, and in accordance with illustrative embodiments of this invention, a clay having the characteristics described is complexed with an organic compound, in particular an arene compound. We use here the definition of "arene" in its broad sense as defined in the Condensed Chemical Dictionary, 7th Edition, Van Nostrand Reinhold Co.: an aromatic hydrocarbon having one or more benzene rings. As described hereinafter, we believe the arene compound is bonded to the clay through the $\pi$-electrons in an aromatic ring and the cupric or argentous ion on the surface of the clay. Such $\pi$-electrons are present in all arene compounds. The arene compounds may contain only carbon and hydrogen atoms, such as benzene, naphthalene, anthracene, phenanthrene, and biphenyl, or may contain alkyl substituents on one or more aromatic rings. Representative substituted arene compounds are toluene, ethylbenzene, n-propylbenzene, n-butylbenzene, dodecylbenzene, cumene, styrene, o-, m-, p-xylenes, mesitylene, 2-bromobiphenyl, 4-chlorobiphenyl, 2,3'-dimethylbiphenyl, 4,4'-dimethylbiphenyl, 1-bromonaphthalene, 2-chloro-naphthalene, 1,3-dichloronaphthalene, 1,4-dimethylnaphthalene, 2,3-dimethylnaphthalene, 2-methylanthracene, 9-ethylanthracene, 9,10-dichloranthracene, 2,4-dimethylanthracene, 3-methylphenanthrene, 9,10-dimethylphenanthrene and the like. Where a halide substituent is present, at least one aromatic ring should be free of halides. It may be noted that not all such arene compounds will form all of the several sub-types of complexes within the scope of the invention and which are hereinafter illustrated by specific examples, particularly in the case of benzene; although all will form at least one.

The new complexes of this invention form upon contacting the cupric- or argentous-exchanged clay with the arene compound after dehydration of the clay. When the clay has been suitably dehydrated, the arene compound is immediately complexed forming a highly colored complex with a characteristic infrared absorption spectrum. Excess arene compound can be adsorbed onto the organo-clay complex to make the complex more organophilic, if desired.

Referring now to FIG. 1, when benzene, which has a characteristic infrared absorption spectrum as given by Curve A, is allowed to contact cupric-exchanged montmorillonite at room temperature and 40% relative humidity, which has a characteristic infrared absorption spectrum as given by Curve B, the benzene is physically adsorbed on the surface of the clay resulting in a complex having a characteristic infrared absorption spectrum as given by Curve C. This complex, which is not colored, consisting of only adsorbed benzene on the surface of the clay is not novel and will form independent of the cation on the surface of the clay. The infrared absorption spectra is similar to that given by the absorption of benzene on various silica surfaces and zeolites (Galkin et al., Trans. Farad. Soc., vol. 60, 431 (1964); Angell et al., J. Coll. Interface Sci., vol. 28, 279 (1968)). When benzene is allowed to contact the cupric-exchanged montmorillonite after the clay is dehydrated at 25° C. over $P_2O_5$ for 24 hours a bright red complex is obtained which has the characteristic infrared absorption spectrum given by Curve E. This spectrum is totally unlike any spectrum ever obtained for benzene. One particularly striking feature of this red complex is the very broad, intense absorption which extends from 1700 cm.$^{-1}$ to beyond 4,000 cm.$^{-1}$. When this red complex is partially hydrated by adsorption of a minor amount of water, a green complex is formed in addition to physically adsorbed benzene having the characteristic infrared absorption spectrum as given by Curve D. This spectrum for the green complex is also totally unlike any spectrum ever obtained for benzene. The green complex and red complex can be converted one to the other by dehydration and hydration, respectively. The green and red complexes are further characterized by intense absorption bands in the ultraviolet-visible region at 380 nm. and 480 nm., respectively. (The nanometer, nm., may also be termed millimicron, m$\mu$.)

Figure 2:
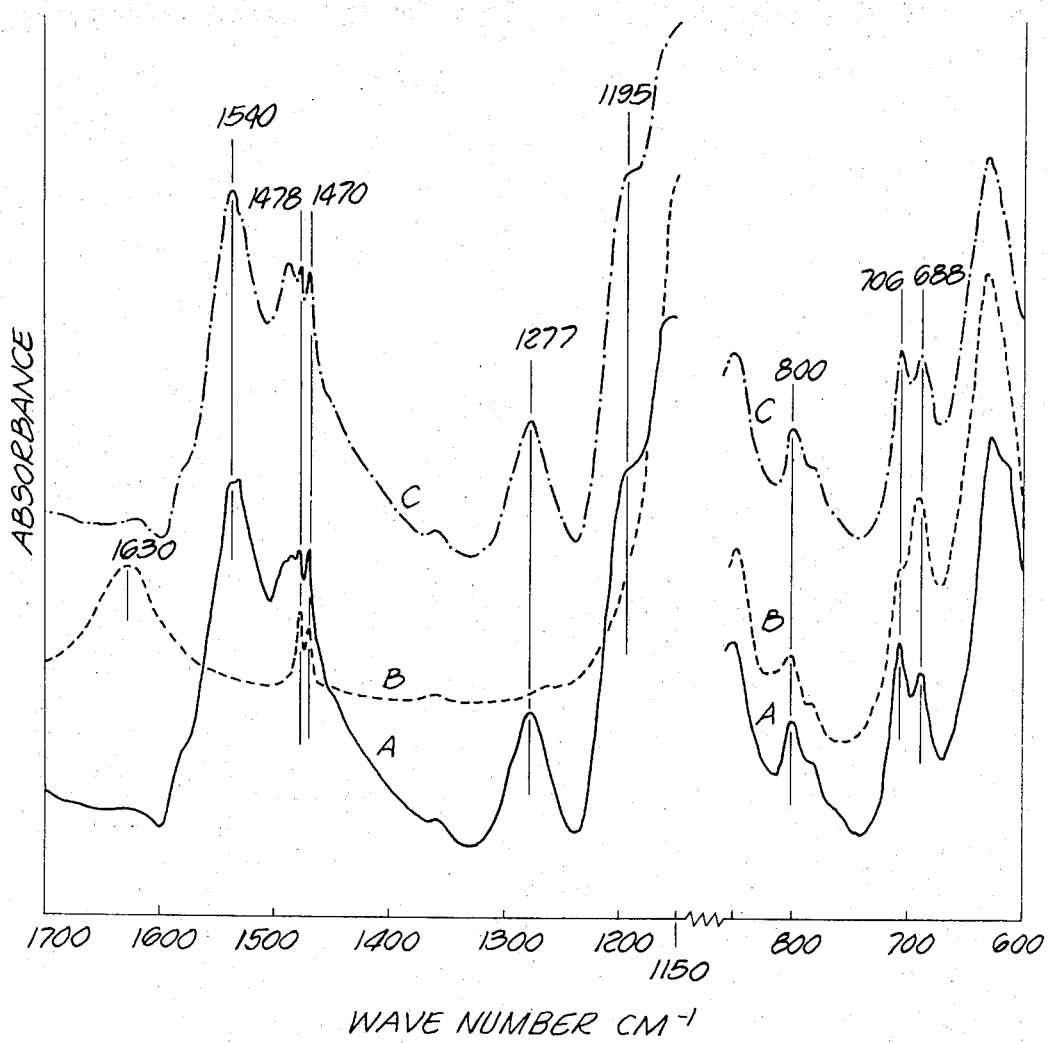
FIG. 2 shows infrared absorption spectra of various complexes further illustrating the invention.

Referring to FIG. 1 in more detail, the sharp bands in Curve B near 3250 and 1630 cm.$^{-1}$, respectively, arise from the stretching and deformation vibrations of both physically adsorbed and coordinated water molecules. The remaining bands in the spectrum are due to vibrational modes of the silicate lattice. For liquid benzene, Curve A, the bands at 1478 and 675 cm.$^{-1}$ can be identified with the C—C stretching ($\nu_{19}$) and C—H out of-plane ($\nu_{11}$) vibrations of the molecule. For benzene physically adsorbed onto the clay, Curve C, these vibrations appear at 1478 and 688 cm.$^{-1}$. The 13 cm.$^{-1}$ high energy shift for the $\nu_{11}$ band probably arises from a perturbation of the benzene $\pi$-electrons in the adsorbed state. There is little doubt that the adsorbed benzene interacts almost exclusively with the silicate lattice, because the $\nu_{19}$ and $\nu_{11}$ vibrations are found at the same frequencies regardless of the nature of the exchangeable metal ion. Upon exhaustively dehydrating the cupric-exchanged montmorillonite and exposing it to benzene vapor the red complex forms, Curve E, in which the $\nu_{19}$ vibration occurs as two broad intense bands at 1540 and 1480 cm.$^{-1}$ and the $\nu_{11}$ vibration occurs as two bands at 800 and 780 cm.$^{-1}$. Hydration of the red complex produces the green complex, Curve D, in which the $\nu_{19}$ and $\nu_{11}$ vibrations occur at 1470 and 706 cm.$^{-1}$, respectively, together with physically adsorbed benzene. It is believed that the water is attached to the cupric ion producing a hydrate of the red complex, rather than to the clay surface, since the infrared absorption spectrum of the benzene in the complex is shifted once again into a characteristic spectrum. This changes in the C—C stretching ($\nu_{19}$) and C—H out-of-plane ($\nu_{11}$) vibrations are illustrated graphically in FIG. 2. In FIG. 2, A is the infrared spectrum for an initial sample of cupric montmorillonite containing all three forms of bound benzene. B is the infrared spectrum of the same sample after exposure to water vapor at 100% relative humidity for 15 seconds at 25° C. C shows the infrared spectrum of the sample after subsequent degassing for 10 minutes at 25° C. Curve A was recorded after degassing cupric montmorillonite for 16 hours at 25° C. and exposing to benzene vapor for eight hours.

Figure 3:
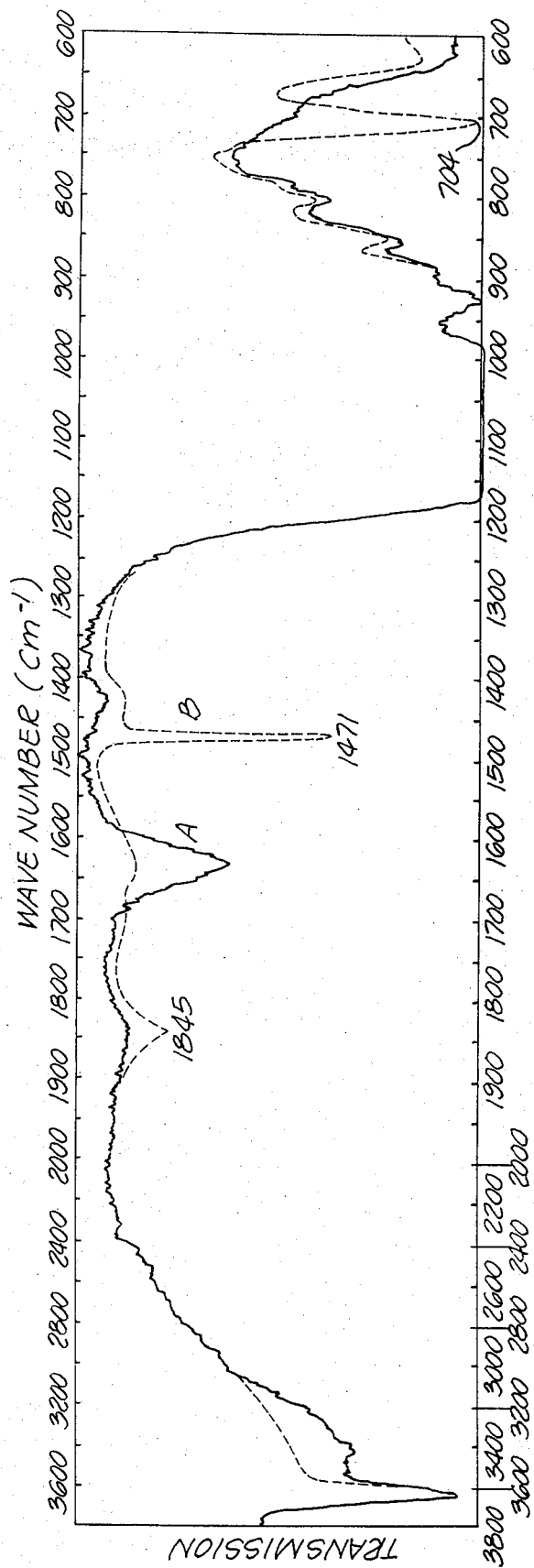
FIG. 3 shows the infrared spectrum of a silver-montmorillonite-benzene complex further illustrating the invention.

FIG. 3 shows the infrared spectrum of a silver-montmorillonite-benzene complex in accordance with the invention. The C—H out-of-plane vibration ($\nu_{11}$) occurs at 704 cm.$^{-1}$ in the complex, while physically adsorbed benzene is at 688 cm.$^{-1}$. Moreover, the C—C stretch ($\nu_{19}$) of the complexed benzene occurs at 1471 cm.$^{-1}$, while in the liquid it appears at 1478 cm.$^{-1}$. In the figure, Curve A is for the silver clay, while Curve B is for the complex with benzene.

The organo-clay complexes of this invention are much more thermally stable than are the samples consisting of physically adsorbed arene and clay as evidenced by the much higher decomposition temperature of these organo-clay complexes. The complex may be prepared by first replacing the exchangeable cations of the clay with a cation selected from the group consisting of cupric, argentous, or mixtures thereof in any known manner as described hereinbefore. The cupric or argentous-exchanged clay is then dehydrated, preferably in the presence of the arene compound. The degree of dehydration of the clay does not appear critical as long as it is sufficient for the complex to form. In general, a three-layer clay having isomorphous substitution within the octahedral layer is easier to dehydrate than is a three-layer clay having isomorphous substitutions within the tetrahedral layer. For instance, dehydration of cupric-exchanged montmorillonite at 25° C. over phosphorus pentoxide for 24 hours followed by exposure to benzene vapor for 24 hours produced a red complex.

The inventive complexes, their method of preparation and use are illustrated further in the following examples which are not to be construed as limiting in scope:

Example 1

The exchangeable alkali metal and alkaline earth metal ions in naturally occurring Wyoming montmorillonite (API No. 25, cation exchange capacity, 92 me./100 g.) were replaced by divalent copper ions by treating the less than two micron fraction of the mineral with aqueous 1 N cupric chloride. Excess cupric chloride was removed by dialysis against distilled water until no test for chloride ion was obtained with silver nitrate.

A thin film of cupric-exchanged montmorillonite was obtained by allowing a portion of the suspension to evaporate on a flat polyethylene surface at room temperature and then peeling away the dry film.

This cupric-exchanged montmorillonite film was partially dehydrated by placing it in a vacuum desiccator containing phosphorus pentoxide at 25° C. for 4 hours. It was then contacted with benzene vapor for 24 hours while still in a partial vacuum. The film changed from blue to green. The infrared absorption spectrum of the green film indicated that excess benzene was present with the green complex as physically adsorbed benzene. This complex contained approximately one molecule of benzene per cupric ion.

Example 2

A film of cupric-exchanged montmorillonite was prepared as in Example 1. This film was placed in a vacuum desiccator containing phosphorus pentoxide at 25° C. for 24 hours. The film, while still in a partial vacuum, was contacted with benzene vapor for 24 hours. The film changed from blue to red. The infrared absorption spectrum of the red film indicated that no physically adsorbed benzene or green complex was present. This complex contained approximately one molecule of benzene per cupric ion.

Example 3

A portion of the cupric-exchanged montmorillonite slurry prepared in Example 1 was freeze-dried to remove all moisture, thus obtaining a very porous, dehydrated clay. This was contacted with benzene vapor which immediately changed the color of the clay from blue to red. The red complex was then soaked 24 hours in liquid benzene at normal atmospheric pressure in a desiccator over phosphorus pentoxide. This resulted in a very dark red clay. The infrared absorption spectrum indicated that physically adsorbed benzene was present with the red complex of benzene.

Example 4

The dark red complex prepared in Example 3 was degassed for 2 hours after removing excess benzene. During this time the film changed to a lighter red. The intensity of the red color was undoubtedly due to the amount of benzene in the complex. The light red complex contained a 4:1 molar ratio of cupric ion to benzene.

Example 5

The procedure of Example 1 was followed, except that silver nitrate was substituted for the cupric chloride. After contact with the benzene vapor, the color was dark slate.

Example 6

Homoionic Wyoming montmorillonite suspensions were prepared by contacting suspensions of Wyoming montmorillonite with 1 N aqueous solutions of various chloride salts as in Example 1 to produce the following clays: sodium exchanged montmorillonite, calcium-exchanged montmorillonite, aluminum-exchanged montmorillonite, chromic-exchanged montmorillonite, ferrous-exchanged montmorillonite, ferric-exchanged montmorillonite, manganous-exchanged montmorillonite, and zinc-exchanged montmorillonite.

Films of these cation exchanged clays were prepared, dehydrated and contacted with benzene as in Example 2. All of these clay films showed no color change on exposure to benzene. The infrared absorption spectra of the films indicated only that physically adsorbed benzene was complexed on the clay surface.

Example 7

Several homoionic Wyoming montmorillonite clay films were prepared and dehydrated as in Example 6. These films contained cupric-exchanged montmorillonite, calcium-exchanged montmorillonite, and ferric-exchanged montmorillonite. Separate films of each cation-exchanged clay were contacted with toluene and xylene vapor for 24 hours. Only the cupric-exchanged montmorillonite changed color, toluene giving a bright green complex and xylene a dark purple complex.

Example 8

Homoionic cupric-exchanged clay suspensions were prepared as in Example 1. Various clay minerals were used as given in Table 1. Films of these cupric-exchanged clays were prepared, dehydrated and contacted with benzene.

The results given in Table 1 indicate that only the swelling, three-layer type clays formed complexes with benzene.

TABLE I

| Mineral | Source | API No.[1] | Source of negative charge | Result of benzene treatment |
|---|---|---|---|---|
| Montmorillonite | Wyoming | 25 | O | + |
| Do | Arizona | 23 | O | + |
| Hectorite | California | 34 | O | + |
| Nontronite | Washington | 33A | T | + |
| Vermiculite | Montana | | T | — |
| Attapulgite | Georgia | 43 | | — |
| Kaolinite | do | 4 | | — |

[1] American Petroleum Institute. Research Project 49 (1951). Reference Clay Minerals.

Example 9

Homoionic hectorite was prepared from purified hectorite by using a solution of cupric chloride. After removing excess salt and drying, the powdered clay was placed in a vacuum desiccator containing phosphorus pentoxide and dehydrated for 18 hours at room temperature and $10^{-3}$ torr. Benzene vapor was then admitted to the desiccator which remained under the partial pressure of benzene overnight. The cupric-exchanged hectorite produced a dark red complex.

Example 10

Cupric-exchanged hectorite prepared and dehydrated as in Example 9 was contacted with mesitylene vapor at its partial pressure overnight. The cupric-exchanged hectorite produced a gold-colored complex.

Example 11

The dark red complex obtained from complexing benzene with cupric-exchanged hectorite in Example 9 was used as a thickener to prepare a grease as follows: 5 grams of the complex, 14 grams of lubricating oil (Conoco 5740), and 5 grams of acetone were mixed and passed across a three-roll paint mill to disperse the complex. A stiff grease was formed which was mechanically stable as evidenced by its resistance to structure change on repeated passes through the three-roll mill.

Example 12

Cupric-exchanged hectorite was prepared as described in Example 9, but was not dehydrated. The undehydrated product was placed in a reflux still fitted for azeotropic distillation, with benzene. Refluxing was commenced, whereupon the cupric hectorite was dehydrated by the azeotropic distillation which took place at approximately the boiling point of benzene. The originally blue cupric hectorite changed first to green and finally to dark red, as the π-complex with the benzene present was formed.

It will be understood that the metal-exchanged clay does not have to be dehydrated prior to contacting with the arene compound, but that the steps of dehydration and contacting may be carried out simultaneously, and indeed the arene compound can be added prior to dehydration, followed by dehydration in the presence of the arene compound, as is illustrated by Example 12 hereinabove.

An important characteristic feature of all of these arene compounds which form complexes with cupric- or argentous-exchanged clays is that they contain an aromatic nucleus, and thus, ipso facto, π-electrons. We believe the arene compound is primarily bonded to the clay through the π-electrons of the arene compound and the cupric or argentous ion since the complexes do not form on other homoionic cation exchanged clays of the required types disclosed herein.

The novel organo-clay complexes of the present invention have wide utility. They are useful as thickeners and fillers in organic systems, as adsorbents in gas chromatography, and as intermediates in the synthesis of various substituted arene compounds.

While the invention has been described with reference to certain specific embodiments, it will be recognized by those skilled in the art that many variations are possible without departing from the spirit and scope of the invention.

Having described the invention, we claim:

1. An organo-clay complex consisting essentially of a clay having in its base-exchange positions cations selected from the group consisting of cupric and argentous and mixtures thereof, said clay being a swelling, three-layer clay having a base exchange capacity of at least twenty-five, and an arene compound, said arene compound being selected from the group consisting of benzene, naphthalene, anthracene, phenanthrene, biphenyl, and the alkyl, chloro, and bromo derivatives thereof having at least one aromatic ring free of chloro and bromo substituents, said arene being bonded to the clay through π-bonding to said cations on the surface of the clay.

2. The complex of claim 1 wherein said clay is selected from the group consisting of montmorillonite, hectorite, and nontronite.

3. The complex of claim 2 wherein said cation is divalent copper.

4. An organo-clay complex consisting essentially of a clay, a cation base-exchanged onto said clay, and an arene compound, said arene compound being bonded to said cation exchanged clay through said cation on the surface of the clay, said clay being a swelling, three-layer clay having a base exchange capacity of at least twenty-five, said cation being selected from the group consisting of cupric and argentous and mixtures thereof, and said organo-clay complex giving an infrared absorption spectrum different from that of liquid, solid and physically adsorbed arene.

5. The complex of claim 4 wherein said clay is selected from the group consisting of montmorillonite, hectorite, and nontronite.

6. The complex of claim 4 wherein said cation exchanged clay is selected from the group consisting of cupric-exchanged montmorillonite, cupric-exchanged hectorite, and cupric-exchanged nontronite.

7. The complex of claim 4 wherein said arene compound is selected from the group consisting of benzene, naphthalene, anthracene, phenanthrene, biphenyl, and the alkyl, chloro, and bromo derivatives thereof having at least one aromatic ring free of chloro and bromo substituents.

8. The complex of claim 6 wherein said arene compound is selected from the group consisting of benzene, naphthalene, anthracene, phenanthrene, biphenyl, and the alkyl, chloro, and bromo derivatives thereof having at least one aromatic ring free of chloro and bromo substituents.

9. The process of producing an organo-clay complex which comprises the steps of:
   exchanging the cations originally present on a swelling three-layer clay having a base exchange capacity of at least twenty-five by cations selected from the group consisting of cupric and argentous and mixtures thereof; and in any order dehydrating the cation exchanged clay thus formed;
   contacting said clay with an arene compound; whereby said arene compound becomes bonded to said clay through π-bonding to said cations of said clay.

10. The process in accordance with claim 9 wherein said arene compound is selected from the group consisting of benzene, naphthalene, anthracene, phenanthrene, biphenyl, and the alkyl, chloro, and bromo derivatives thereof having at least one aromatic ring free of chloro and bromo substituents.

11. The process in accordance with claim 9 in which said clay is selected from the group consisting of montmorillonite, hectorite, and nontronite.

12. The process in accordance with claim 11 wherein said cation is divalent copper.

References Cited

Chemical Abstracts, vol. 54, p. 38f (1960).
Chemical Abstracts, vol. 54, p. 24194a,b (1960).
Chemical Abstracts, vol 64, p. 10937e (1966).
Bradley, JACS, vol. 67, pp. 975–981 (1945).
MacEwan, Trans. Faraday Soc., vol. 44, pp. 349–367 (1948).
Barrer et al.: Trans Faraday Soc, vol. 50, pp. 980–989 (1954).

HELEN M. S. SNEED, Primary Examiner

U.S. Cl. X.R.

55—67; 106—288 Q; 260—429 A, 438.1, 668 R